United States Patent [19]
Frost

[11] 3,777,594
[45] Dec. 11, 1973

[54] MULTI-SPEED TRANSMISSION
[75] Inventor: Barry Lewis Frost, Jackson, Mich.
[73] Assignee: Clark Equipment Company, Buchanan, Mich.
[22] Filed: Dec. 9, 1971
[21] Appl. No.: 206,250

[52] U.S. Cl. .............................................. 74/687
[51] Int. Cl. .......................................... F16h 47/04
[58] Field of Search ..................................... 74/687

[56] References Cited
UNITED STATES PATENTS

| | | | |
|---|---|---|---|
| 1,951,345 | 3/1934 | Centervall | 74/687 |
| 2,517,879 | 8/1950 | Howard | 74/687 X |
| 2,939,342 | 6/1960 | Woydt et al. | 74/687 |
| 3,132,533 | 5/1964 | Baker | 74/687 |
| 3,396,607 | 8/1968 | Ross | 74/687 |

*Primary Examiner*—Arthur T. McKeon
*Attorney*—Kenneth C. Witt et al.

[57] ABSTRACT

A multi-speed transmission is disclosed having a planetary gear set wherein the sun gear is connected for rotation with an output shaft, a variable speed control shaft is connected for rotation with the planetary ring gear, and a planet gear which is in mesh with both the ring gear and the sun gear is carried by a planet carrier. A first gear is connected for rotation with the planet carrier and another gear having the same operating pitch diameter as the first is connected to rotate with the ring gear. A relatively wide coupling gear is in constant mesh with the first gear but may be moved axially into additional mesh with the other gear when these two gears are rotating at the same operating pitch diameter velocities to thereby connect the planet carrier for rotation with the control shaft. A second gear in constant mesh with a third gear that is rotated by a suitable power source is axially movable into mesh with the first gear while this first gear and the planet carrier are still connected for rotation with the control shaft via the coupling gear, this meshing movement of the second gear occurring at a time when the first gear and the second gear are rotating at substantially the same operating pitch line velocities. The second gear may also be moved axially out of mesh with the first gear while these two gears are under load.

17 Claims, 3 Drawing Figures

INVENTOR
BARRY L. FROST
BY
ATTORNEY

PATENTED DEC 11 1973
3,777,594
SHEET 2 OF 2

INVENTOR
BARRY L. FROST
BY
Robert J. Horton
ATTORNEY

MULTI-SPEED TRANSMISSION

BACKGROUND OF THE INVENTION

This invention relates to transmission mechanisms of the type providing multiple speed ranges with continuous speed variation within each speed range. Such mechanisms commonly employ mechanical speed integrators having three elements, such as planetary of differential gearing where one element is rotated at a speed which is a dependent function of the speeds of the other two elements. Usually, one of the integrator elements is connected to be rotated by a power source through one of the well-known mechanical power transmission mechanism (including gearing and frictional clutches) and another integrator element is connected to a control means whose speed may be continuously varied to modulate the speed of the dependent element. One limitation upon such devices arises if it is desired to deliver a speed from the integrator which is greatly different from the speed of the mechanically rotated element, in which case it is necessary to employ a variable speed control means of undue capacity and speed range. A known partial solution to this problem is to connect two of the integrator elements for rotation with the control means through a first speed range; disconnect the control means from one of these elements, connect the mechanical source to that element; and then vary the speed of the control means to provide output speeds through a second speed range. Such an approach provides two speed ranges and reduces the required capability of the variable speed control means, but it will be recognized that some form of clutching mechanism must be utilized to perform the required connecting and disconnecting of integrator elements. Heretofore this clutching has been accomplished by means of the wellknown friction clutch mechanisms and therefore all of the wellknown deficiencies of these mechanisms including: cost, size, wear, and life; have been inherited by this type of variable speed transmission.

One object of my invention is to provide a variable speed, multiple range, transmission wherein the usual clutches are not employed. The unique mechanism which I have adapted to this purpose is based upon the fact that meshed gears (including spur gears and thrust balanced helical gears) will move axially relative to one another while meshed without the interruption of power flow therebetween, and therefore may enter into or leave a given power path without the clashing of teeth, binding due to bias, or locking due to an inability of splined parts to slide relative to one another while under load.

SUMMARY OF THE INVENTION

In carrying out my invention in one preferred embodiment thereof, I provide a transmission having a planetary system set with first, second and third elements. A variable speed control shaft is connected to rotate and be rotated by the first element, an output shaft is connected to be rotated by the third element, and a first gear is connected for rotation with the second element. The transmission includes a second gear in mesh with a third gear which may be driven by any suitable means and the second gear is movable out of mesh with the first gear when this first gear and the second gear are rotating under load.

DESCRIPTION OF EMBODIMENT

Figure 1:
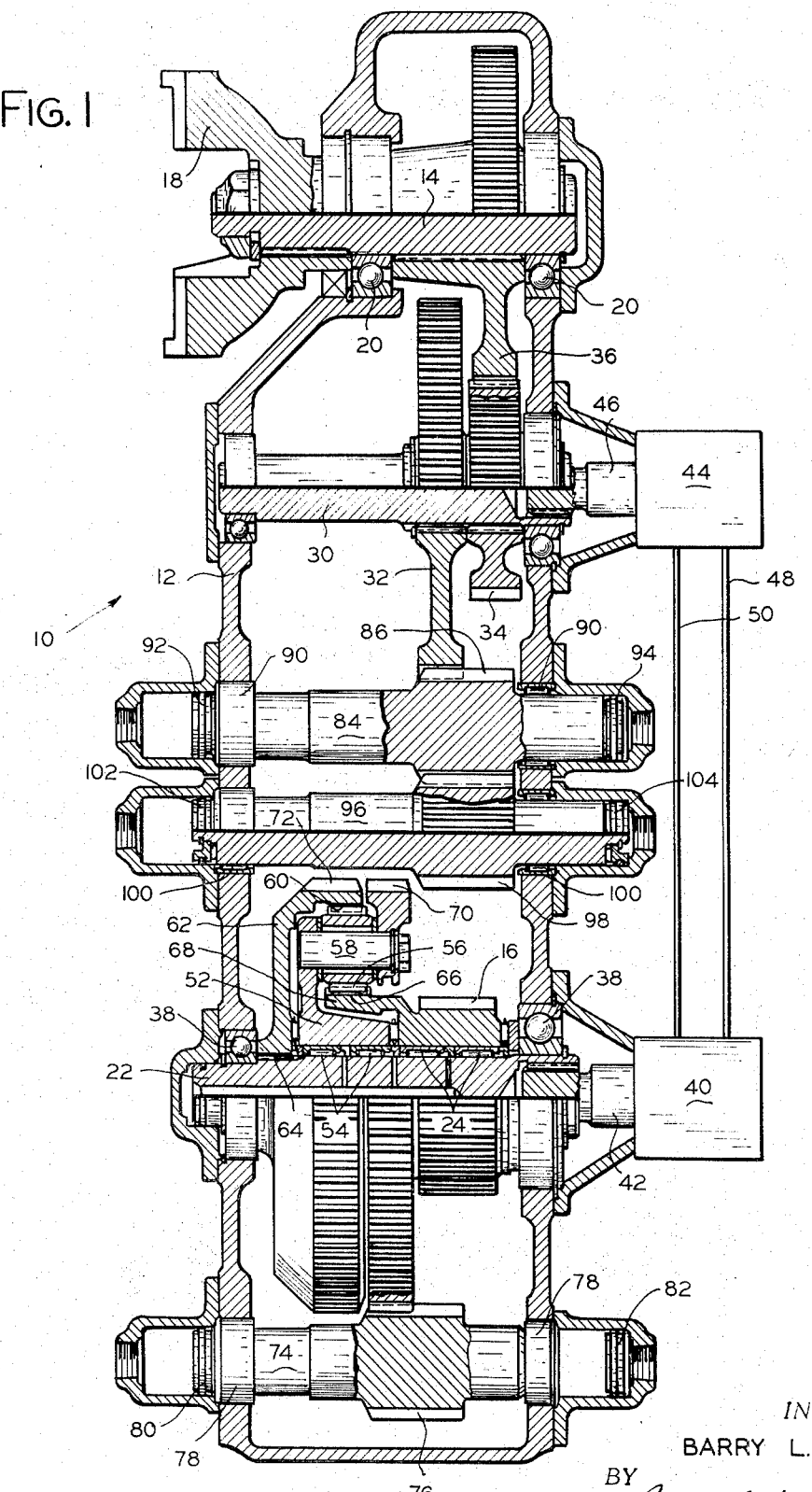
FIG. 1 is an unwrapped sectional view of a simplified transmission embodying this invention.
Figure 2:
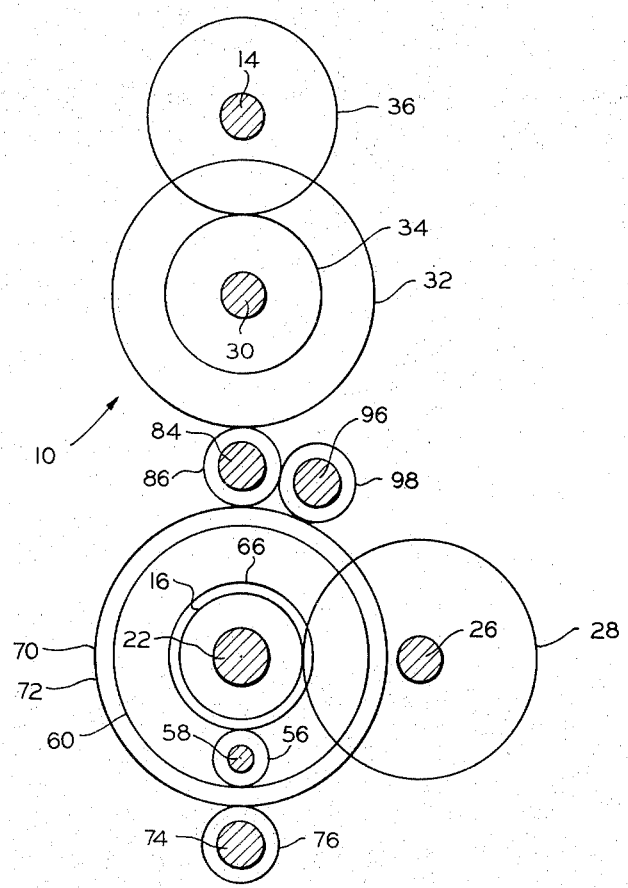
FIG. 2 illustrates the actual relative positions of the various shafts and gears of the transmission shown in FIG. 1.

Referring to FIGS. 1 and 2 of the drawing, a simplified transmission which provides two speed ranges and embodies this invention is indicated generally by the numeral 10. The components of transmission 10 are supported in working relationship relative to one another by a case or housing 12 and, as is common, the housing may also serve to enclose these components for their protection and lubrication. Transmission 10 includes an input shaft 14 and an output gear 16 and the transmission may be connected to receive power from any suitable power source, such as an internal combustion engine or hydraulic motor (not shown), by means of a coupling 18 fixed to one end of the input shaft. A pair of bearings 20 rotatably support input shaft 14 within housing 12 and output gear 16 is rotatably mounted upon a control shaft 22 for rotation relative thereto by means of the bearings 24. Any appropriate means may be employed to connect output gear 16 for the delivery of power from transmission 10, as for example, an output shaft 26 (FIG. 2) having a gear 28 fixed thereto which is in constant mesh with output gear 16. Transmission 10 also includes an intermediate shaft 30 rotatable within housing 12 having a pair of gears 32 and 34 fixed thereto which are connected to be driven by input shaft 14 through the constant gear mesh between gear 34 and a gear 36 fixed for rotation with input shaft 14.

Control shaft 22 is supported for rotation within housing 12 upon the pair of bearings 38 and this control shaft is connected in any suitable manner to a variable speed control means which is adapted to controllably vary the speed of control shaft 22 as required to provide the operation of transmission 10 described hereinafter. By way of explanation, the control means may include a motor-pump device 40 whose rotor shaft 42 is fixed for rotation with control shaft 22 and a pump-motor device 44 whose rotor shaft 46 is connected for the transmission of power with intermediate shaft 30; these devices being hydraulically interconnected by the lines 48 and 50. In order to provide the desired control over the speed of control shaft 22 either of these devices may be of the variable displacement type and any appropriate control system (not shown) may be employed to sense the rotative speed of certain of the components of transmission 10 and vary the displacement of the variable device to thereby vary the speed of control shaft 22. A planet carrier 52 is mounted for rotation upon control shaft 22 by means of the bearings 54 and a planet gear 56 is rotatably supported from the planet carrier upon the planet shaft 58. Planet gear 56 meshes with a ring gear 60 connected for conjoint rotation with control shaft 22 by means of a drum 62 which is splined to the control shaft at 64, and this planet gear also meshes with a sun gear 66 connected through a web 68 for conjoint rotation with output gear 16. A gear 70 is connected for conjoint rotation with planet carrier 52 and another gear 72 which has substantially the same operating pitch diameter as gear 70 is connected for conjoint rotation with control shaft 22; gear 72 being preferably formed in the outer surface of drum 62. Means are provided for selectively connecting planet carrier 52 and control shaft 22 together, such connecting means being provided in this embodiment by a shaft 74 having a relatively wide coupling gear 76 fixed thereto. Shaft 74 is journaled for rotation within housing 12 upon the bearings 78 and may be controllably moved or shifted along its axis by any suitable means, such as by either supplying pressurized fluid behind an axially movable piston 80 to shift shaft 74 axially toward the right as viewed in FIG. 1 or by supplying pressurized fluid behind an axially movable piston 82 to shift shaft 74 to the left. Coupling gear 76 is in constant mesh with gear 70 but since the two gears 70 and 72 are of the same operating pitch diameters it will be understood that the coupling gear may be selectively shifted with shaft 74 so that this gear moves into and out of an additional coupling mesh with gear 72 when gears 72 and 70 are rotating at substantially the same operating pitch diameter velocities, thereby rotatably coupling planet carrier 52 and control shaft 22 together. A shaft 84 having a relatively wide gear 86 fixed for rotation therewith is journaled within housing 12 upon the bearings 90 and may be selectively moved or shifted, while rotating along its axis by any suitable means such as by supplying pressurized fluid behind an axially movable piston 92 to shift shaft 84 to the right as viewed in FIG. 1 or by supplying pressurized fluid behind an axially movable piston 94 to move shaft 84 to the left. Gear 86 is in constant mesh with gear 32 and, as is best understood with reference to FIG. 2, is movable with shaft 84 into and out of additional mesh with gear 70 when this gear and gear 86 are rotating at substantially a synchronous operating pitch line velocity. Another movable shaft 96 having a relatively wide gear 98 fixed for rotation therewith is journaled within housing 12 upon the bearings 100 and this shaft 96 is also selectively movable or shiftable along its axis, while rotating by suitable means, such as by supplying pressurized fluid behind an axially movable piston 102 to move shaft 96 to the right as viewed in FIG. 1 or by supplying pressurized fluid behind an axially movable piston 104 to move shaft 96 to the left. Gear 98 is in constant mesh with gear 86 for the receipt of power therefrom and may be selectively moved with shaft 96 axially into and out of additional driving mesh with gear 70 when this gear and gear 98 are rotating at substantially the same operating pitch line velocities.

Having now described the components of a particular simplified transmission embodying this invention the overall concept of my invention will be better understood with reference to the operation of transmission 10. Although the rotative speed of input shaft 14 may vary during operation, for clarity of explanation it will be assumed here that the input shaft is driven at a constant speed and in a rotative direction arbitrarily designated to be positive. Initially, it will be considered that coupling gear 76 is moved out of mesh with gear 72 and that both gears 86 and 98 are moved out of mesh with gear 70 (that is, these gears are shifted to the positions shown in FIG. 1). In this condition, which may be called "neutral," it will be observed that planetary carrier 52 is not connected to be rotated by either gears 86 or 98 or by the coupling gear 76 and therefore output gear 16 may freely rotate regardless of the operation of input shaft 14 or control shaft 22.

If it is desired to accelerate output gear 16 in the positive rotative direction, control shaft 22 and planetary carrier 52 are first coupled together for conjoint rotation. Such coupling is accomplished by utilizing the control means to set the operating pitch line velocity of gear 72 substantially equal to that of gear 70 (these speeds most commonly being zero when the transmission is in neutral) and then shifting shaft 74 to the left as viewed in FIG. 1 so that coupling gear 76 moves into coupling mesh with both gear 70 and gear 72. Planetary carrier 52 and ring gear 60 are now geared for rotation with control shaft 22. The positive rotative speed of output gear 16 may now be increased as desired through what may be called a first or low speed range by increasing the positive rotative speed of control shaft 22 via the controlled operation of the variable speed control means. As the positive rotative speed of control shaft 22 increases through this low speed range the positive speed of gear 70 also increases due to the coupling mesh of gear 76 and the control system is adapted to sense the increasing operating pitch line velocity of gear 70 and signal the point at which this velocity is synchronous with the operating pitch line velocity of movable gear 86. When the pitch line velocities of gear 86 and gear 70 are compatible gear 86 may be moved into mesh with gear 70 (FIG. 2) without the clashing of gear teeth by shifting shaft 84 to the left as viewed in FIG. 1. It should be noted that in this condition output gear 16 is connected to be rotated by both control shaft 22 via the coupling mesh of coupling gear 76 and by gear 86 via its mesh with gear 70. Coupling gear 76 may now be shifted out of coupling mesh with gear 72 so that this gear 72 may be rotated at a speed different from that of gear 70. Thereafter the positive rotative speed of output gear 16 may be increased even further as desired through what may be called a second or high speed range by decreasing the positive speed of gear 72 relative to that of planetary carrier 52, such an increase in output speed of gear 16 being accomplished by reducing the positive rotative speed of control shaft 22 even through zero into the negative rotative direction.

If it is desired to variably drive output gear 16 in the negative rotative direction it will be understood the operation of transmission 10 is essentially similar to that previously explained for positive operation excepting that the speed of control shaft 22 is controllably varied in the negative direction and the movable or shiftable shaft 96 and gear 98 are employed in the second or high speed range in the stead of shaft 84.

Figure 3:
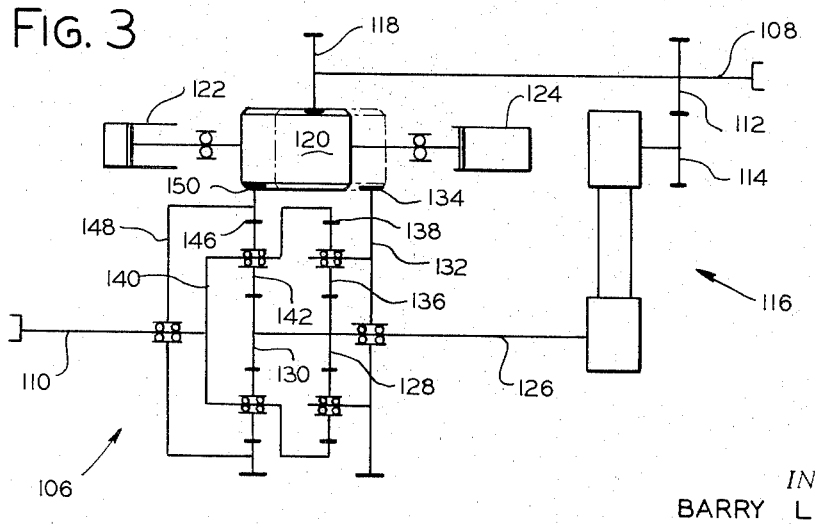
FIG. 3 is a schematic representation of another simplified transmission embodying this invention.

Referring now to FIG. 3, a transmission 106 also embodying this invention is shown schematically and reference to this transmission and its operation as explained hereinafter will enable those skilled in the art to more fully understand the breadth of my invention. Transmission 106 includes an input shaft 108 which may be driven by any suitable means and an output shaft 110 which may be connected for the delivery of power from transmission 106. A gear 112 is fixed for rotation with input shaft 108 and meshes with gear 114 connected for the transmission of power with a variable speed control means indicated generally by the numeral 116, this control means being similar to the control means explained earlier in reference to transmission 10. Another gear 118 is also fixed for rotation with input shaft 108 and is in constant mesh with a relatively wide gear 120 which may be shifted axially as explained hereinafter by means of the piston-cylinder devices 122 and 124. A variable speed control shaft 126 is connected to rotate and be rotated by the variable speed control means and a pair of sun gears 128 and 130 are connected for conjoint rotation with control shaft 126. A planet carrier 132 having a gear 134 fixed for rotation therewith is rotatably mounted relative to control shaft 126 and carries a planet gear 136 in mesh both with sun gear 128 and with a ring gear 138. Ring gear 138 is connected for rotation with a second planet carrier 140 which carries a second planet gear 142 and the planet carrier 140 is connected for rotation with output shaft 110, second planet gear 142 meshing both with sun gear 130 and with a second ring gear 146 rotatably mounted relative to output shaft 110 by means of the drum 148. Finally, a gear 150 having the same operating pitch diameter as gear 134 is connected by means of drum 148 for rotation with second ring gear 146 and, as will now be understood with reflection upon the previously explained operation of transmission 10, gear 120 may be moved or shifted axially into and out of mesh with gear 150 (as shown solid in FIG. 3) as well as with gear 134 (as shown in phantom in FIG. 3) in the manner explained below.

In operation, transmission 106 is conditioned for neutral and for low speed range operation by moving or shifting gear 120 into mesh with gear 150 and out of mesh with gear 134 (the left hand position shown solid in FIG. 3). In this condition, ring gear 146 is rotated in the same direction and at a speed determined by the direction and speed of input shaft 108 via gear 120, and control shaft 126 is controllably rotated to rotate sun gear 130 in the opposite direction and at a speed relative to ring gear 146 whereat the planet gear 142 does not rotate planet carrier 140 and at this point transmission 106 may be said to be in a neutral condition. When it is desired to accelerate output shaft 110 through the first or low speed range the rotative speed of control shaft 126 is decreased to increase the speed of output shaft 110. The speed of output shaft 110 in this direction is increased through the first speed range by decreasing the opposite rotative speed of control shaft 126 to zero and further by increasing the speed of control shaft 126 in the same direction as ring gear 146. As the speed of output shaft 110 increases through this low speed range the speed of gear 134 also increases since the speeds of ring gear 138 and sun gear 128 increase, and a control system (not shown) is adapted to sense the operating pitch line velocity of gear 134 and signal the point at which this velocity is substantially equal to the operating pitch line velocity of movable gear 120. When the operating pitch line velocities of gear 134 and gear 120 are substantially the same, gear 120 may be moved into additional mesh with gear 134 to a position intermediate the positions shown in solid and in phantom in FIG. 3. It should be noted that when gear 120 is in this intermediate position it is in mesh with both gear 150 and with gear 134 so that output shaft 110 is, at this point connected to be rotated both by the action of planetary gear 136 upon ring gear 138 and by the action of planetary gear 142 upon planet carrier 140. Thereafter, movable gear 120 may be shifted out of mesh with gear 150 (to the right hand position shown in phantom in FIG. 3) and output shaft 110 may be further accelerated as desired through the second or high speed range by reducing the rotative speed of sun gear 128 via the controlled rotative speed of control shaft 126. Maximum output speed may then be obtained when control shaft 126 reaches maximum speed in a direction opposite to that of gear 134.

While I have described and illustrated herein two simplified transmission mechanisms which embody this invention, it will be appreciated that other mechanisms may be devised which employ my inventive concept. For example, the transmission explained herein have included what is known as "planetary" mechanisms but it will be understood that the commonly known "differential" type mechanism may be utilized to equal effect since it is only required that mechanisms having three elements to support the load be utilized which provide an output as a function of two inputs where the speed of one element may be varied. Consequently, reference herein to "planetary means" should be considered to also include differential and other equivalent speed integrating mechanisms and combinations thereof. By way of further example, the "movable" gears utilized in the illustrative transmissions explained herein have been described as being axially movable into and out of mesh with certain gears but it will be understood that these gears may be entered into engagement by other movements such as by being rolled or swung into and out of engagement where appropriate. It should therefore be understood that I intend to cover by the appended claims all such mechanisms and modifications as fall within the spirit and scope of my invention.

I claim:

1. A transmission comprising:
    a planetary means having first, second and third elements,
    a variable speed control shaft connected to rotate and be rotated by said first element,
    a variable speed control means connected with said control shaft to provide means for controllably varying the rotative speed of said control shaft,
    a first shaft connected to rotate and be rotated by said third element,
    a first gear connected for rotation with said second element,
    a second gear, and a third gear in constant mesh with said second gears, and
    means for moving said second gear into mesh with said first gear when said first gear and said second gear are rotating at substantially the same operating pitch line velocities and out of mesh with said first gear when said second gear and said first gear are rotating under load.

2. A transmission as set forth in claim 1 and including means for connecting said control shaft to rotate said second element when said second gear is not in mesh with said first gear, said connecting means also connecting said control shaft to rotate said second element when said second gear is in mesh with said first gear and said control shaft is rotating at a selected speed relative to the speed of said second gear.

3. A transmission as set forth in claim 2 wherein said planetary means includes a ring gear as said first element, a sun gear as said third element, a planet carrier as said second element, and a planet gear carried by said planet carrier and in mesh with both said ring gear and said sun gear, said ring gear being connected for rotation with said control shaft, said first gear being connected for rotation with said planet carrier, and said first shaft being an output shaft connected for rotation with said sun gear.

4. A transmission as set forth in claim 3 wherein said planetary means includes a fourth gear connected for rotation with said ring gear, said fourth gear having substantially the same operating pitch diameter as said first gear and said connecting means including a movable coupling gear, said coupling gear being movable into and out of mesh with said fourth gear when said second gear is in mesh with said first gear and said fourth gear is rotating at substantially the same operating pitch diameter velocity as said first gear.

5. A transmission as set forth in claim 3 wherein the operating pitch circle of said second gear is tangent with the operating pitch circle of said first gear and wherein said second gear is axially movable into and out of mesh with said first gear when said second and first gears are rotating at substantially the same pitch line velocities.

6. A transmission as set forth in claim 5 wherein said planetary means includes a fourth gear connected for rotation with said ring gear, said fourth gear having substantially the same operating pitch diameter as said first gear and said connecting means including an axially movable coupling gear, said coupling gear being in constant mesh with said first gear and movable into and out of mesh with said fourth gear when said second gear is in mesh with said first gear and said fourth gear is rotating at substantially the same operating pitch diameter velocity as said first gear.

7. A transmission as set forth in claim 5 including a second shaft rotatable substantially parallel with said control shaft and wherein said second gear is fixedly supported upon said second shaft, said second shaft being movable along its axis while rotating to provide said means for moving said second gear into and out of mesh with said first gear.

8. A transmission as set forth in claim 2 wherein said connecting means includes a second planetary means having fourth, fifth, and sixth elements and a fifth gear connected for rotation with said fourth element, said control shaft being connected to rotate and be rotated by said fifth element, and said second gear being in mesh with said fifth gear when said control shaft is connected to rotate said second element.

9. A transmission as set forth in claim 8 wherein said second gear may be moved into and out of mesh with said first gear while said second gear is still in mesh with said fifth gear when said control shaft is rotating at a selected speed relative to the speed of said second gear.

10. A transmission as set forth in claim 9, wherein said first planetary means includes a first sun gear as said first element, a first ring gear as said third element, a first planet carrier as said second element, and a first planet gear carried by said first planet carrier and in mesh with both said first sun gear and said first ring gear, said first sun gear being connected for rotation with said control shaft, said first gear being connected for rotation with said first planet carrier, and said first shaft being connected for rotation with said second planet means, and wherein said second planetary means includes a second ring gear as said fourth element, a second sun gear, as said fifth element, a second planet carrier as said sixth element, and a second planet gear carried by said second planet carrier and in mesh with both said second ring gear and said second sun gear, said second ring gear being connected for rotation with said fifth gear, said second planet carrier being connected for rotation with said first shaft and said control shaft being connected for rotation with said second sun gear.

11. A transmission as set forth in claim 10 wherein said first and fifth gears have substantially the same operating pitch diameters.

12. A transmission as set forth in claim 11 wherein the operating pitch circle of said second gear is tangent with the operating pitch circles of said first and fifth gears and wherein said second gear is axially movable into and out of mesh with said first gear while said second gear is still in mesh with said fifth gear and also is axially movable into and out of mesh with said fifth gear while still in mesh with said first gear when said control shaft is rotating at a selected speed relative to the speed of said second gear.

13. A transmission as set forth in claim 12 and including a third shaft rotatable substantially parallel with said control shaft and wherein said second gear is fixedly supported upon said third shaft, said third shaft being movable along its axis while rotating to provide said means for moving said second gear into and out of mesh with said first gear.

14. A transmission as set forth in claim 9,
wherein said first planetary means includes a first sun gear as said first element, a first ring gear as said third element, a first planet carrier as said second element, and a first planet gear carried by said first planet carrier and in mesh with both said first ring gear and said first sun gear, said first ring gear being connected for rotation with said first shaft, said first sun gear being connected for rotation with said control shaft and said first gear being connected for rotation with said planet carrier, and wherein said second planetary means includes a second ring gear as said fourth element, a second sun gear as said fifth element, and a second planet carrier as said sixth element, and a second planet gear carried by said second planet carrier and in mesh with both said second ring gear and said second sun gear, said second ring gear being connected for rotation with said fifth gear, said second sun gear being connected for rotation with said control shaft, and said second planet carrier being connected for rotation with said first shaft.

15. A transmission as set forth in claim 14 wherein said first and fifth gears have substantially the same operating pitch diameters.

16. A transmission as set forth in claim 15 wherein the operating pitch circle of said second gear is tangent with the operating pitch circles of said first and fifth gears and wherein said second gear is axially movable into and out of mesh with said first gear while said second gear is still in mesh with said fifth gear and also is axially movable into and out of mesh with said fifth gear while still in mesh with said first gear when said control shaft is rotating at a selected speed relative to the speed of said second gear.

17. A transmission as set forth in claim 16 and including a third shaft rotatable substantially parallel with said control shaft and wherein said second gear is fixedly supported upon said third shaft, said shaft being movable along its axis while rotating to provide said means for moving said second gear into and out of mesh with said first gear.

* * * * *